United States Patent
Ryu et al.

(10) Patent No.: US 10,349,047 B2
(45) Date of Patent: Jul. 9, 2019

(54) DEVICE FOR TESTING ANGLE OF VIEW OF CAMERA

(71) Applicant: LG INNOTEK CO., LTD., Seoul (KR)

(72) Inventors: Dae Sang Ryu, Seoul (KR); Kyoung Chan Park, Seoul (KR); Yong Su Lee, Seoul (KR); Hyung Seok Lim, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 0 days.

(21) Appl. No.: 15/758,628

(22) PCT Filed: Sep. 7, 2016

(86) PCT No.: PCT/KR2016/010004
§ 371 (c)(1),
(2) Date: Mar. 8, 2018

(87) PCT Pub. No.: WO2017/043853
PCT Pub. Date: Mar. 16, 2017

(65) Prior Publication Data
US 2018/0249152 A1 Aug. 30, 2018

(30) Foreign Application Priority Data
Sep. 8, 2015 (KR) ........................ 10-2015-0127250

(51) Int. Cl.
*G01M 11/00* (2006.01)
*H04N 17/00* (2006.01)
(Continued)

(52) U.S. Cl.
CPC .......... *H04N 17/002* (2013.01); *G01M 11/02* (2013.01); *G03B 43/00* (2013.01)

(58) Field of Classification Search
CPC .... H04N 17/002; G01M 11/00; G01M 11/02; G03B 43/00
See application file for complete search history.

(56) References Cited

U.S. PATENT DOCUMENTS

2003/0090586 A1* 5/2003 Jan ........................ H04N 5/217
348/335
2014/0240518 A1 8/2014 Lewinnek et al.

FOREIGN PATENT DOCUMENTS

JP 2015-099041 A 5/2015
KR 10-0780190 B1 11/2007
(Continued)

OTHER PUBLICATIONS

International Search Report in International Application No. PCT/KR2016/010004, filed Sep. 7, 2016.

*Primary Examiner* — Roy M Punnoose
(74) *Attorney, Agent, or Firm* — Saliwanchik, Lloyd & Eisenschenk

(57) ABSTRACT

The present invention relates to a device for testing an angle of view of a camera. The present invention may comprise: a first light source which is arranged to face an image sensor, and has a first width and a second width longer than the first width; and a second light source and a third light source which are disposed on both sides of the image sensor in the direction of the first width, respectively. The present invention can inhibit an interference of the light source or a bracket supporting the light source by reducing the number of light sources. In addition, since it is possible to measure the angle of view of a camera by reducing the light sources, the present invention can reduce the manufacturing costs of a device for testing an angle of view of a camera.

12 Claims, 4 Drawing Sheets

(51) Int. Cl.
*G03B 43/00* (2006.01)
*G01M 11/02* (2006.01)

(56) References Cited

FOREIGN PATENT DOCUMENTS

| KR | 10-0808019 B1 | 2/2008 |
| KR | 10-2010-0134326 A | 12/2010 |

* cited by examiner

DEVICE FOR TESTING ANGLE OF VIEW OF CAMERA

CROSS REFERENCE TO RELATED APPLICATIONS

This application is the U.S. national stage application of the International Patent Application No. PCT/KR2016/010004, filed Sep. 7, 2016, which claims priority to Korean Application No. 10-2015-0127250, filed Sep. 8, 2015, the disclosures of each of which are incorporated herein by reference in their entirety.

TECHNICAL FIELD

The teachings in accordance with exemplary and non-limiting embodiments of this invention relate generally to a device for testing angle of view of camera (hereinafter referred to preferably as "camera view angle testing device"), and more specifically, to a device for testing angle of view of vehicle camera.

BACKGROUND ART

In general, testing of an angle of view of a camera (hereinafter referred to as "camera view angle testing") is realized by checking whether a light is received that is incident at a predetermined angle on a certain point of an image sensor accommodated in a camera module.

A vehicle camera is generally supplied in one assembled module state of an image sensor and a lens, and at this time, when a focus and optical axis between the lens and the image sensor are not accurately aligned, it is difficult to realize a desired high performance of camera function.

That is, when an image is photographed by a camera, a clear and clean image can be photographed when a light of a subject incident through a lens is captured with an accurate focus and optical axis on an image sensor, where an image becomes blurred, resulting in a great degraded reliability of a camera, when assembly is completed with the lens and the image sensor not being properly aligned.

Furthermore, a horizontal angle of view (hereinafter referred to as "view angle") in a vehicle camera is more important than a vertical view angle due to its characteristics, and in light of the fact that a conventional view angle testing device was intended to measure not only a horizontal view angle but also a vertical view angle, a lot of light sources has been required in order to measure a view angle of a vehicle camera through the conventional view angle testing device.

In addition, in order to ascertain a wider view a super wide angle camera having a view angle over 180° has been recently developed, however, the conventional view angle testing device applied with the super wide angle camera is still insufficient to measure a view angle of a vehicle camera.

DETAILED DESCRIPTION OF THE INVENTION

Technical Subject

The present invention is provided to solve the abovementioned disadvantages/problems, and it is an object of the present invention to provide a camera view angle testing device reduced in the number of light sources in order to inhibit a physical mutual interference of the light sources when the light sources are set in order to test a lens view angle.

Another object of the present invention is to provide a camera view angle testing device configured to test a super wide horizontal view angle exceeding 180° by arranging one light source for vertical view angle of a lens while arranging a plurality of light sources for horizontal view angle of the lens.

Still another object is to provide a camera view angle testing device configured to measure a view angle of a lens and to simultaneously adjust a focus of a light received on an image sensor by rightly correcting a twist or tilt phenomenon of the image sensor.

Technical Solution

In one general aspect of the present invention, there is provided a device for testing an angle of view of a camera (camera view angle testing device), the device comprising:
a first light source which is arranged to face an image sensor, and has a first width and a second width relatively longer than the first width; and
a second light source and a third light source which are disposed on both sides of the image sensor in the direction of the first width, respectively, based on the image sensor.

Preferably, but not necessarily, the image sensor may receive a light emitted from the first light source to a lengthwise direction of the first width at 0~0.7 field, and the image sensor may receive a light emitted from the first light source to a lengthwise direction of the second width at 0~0.5 field, when the image sensor is divided from a center of light reception region to a farthest point at 0~0.7 field.

Preferably, but not necessarily, the image sensor may have a third width and a fourth width relatively shorter than the third width, and a direction of the first width may correspond to a direction of the third width, and a direction of the second width may correspond to a direction of the fourth width.

Preferably, but not necessarily, a lengthwise direction of the first width may be orthogonal to a lengthwise direction of the second width.

Preferably, but not necessarily, the first light source may be disposed in parallel with the image sensor.

Preferably, but not necessarily, the second light source or the third light source may be disposed at over 180° along a lengthwise direction of the first width about the image sensor.

Preferably, but not necessarily, the second light source or the third light source may be disposed at a radius-identical imaginary spherical tangent surface.

Preferably, but not necessarily, the second light source or the third light source may be such that a length of lengthwise direction at the second width is shorter than a length of the second width.

Preferably, but not necessarily, the second light source or the third light source may be such that a length of lengthwise direction at the second width is same as a length of the second width.

Preferably, but not necessarily, any one or more of the first to third light sources may include an LED lamp.

In another general aspect of the present invention, there is provided a device for testing an angle of view of a camera (camera view angle testing device), the device comprising:
a first light source which is arranged to face an image sensor; and
second, third, fourth and fifth light sources, each diagonally arranged from a center of the first light source, wherein any one diagonal line of the first light source and the second and fourth light sources may abut to any one imaginary radius about the image sensor, and the other diagonal line of the first light source and the third light source and the fifth light source may abut to another imaginary radius about the image sensor.

Preferably, but not necessarily, each of a plural number of second to fifth light sources may be disposed on an imaginary radius about the image sensor.

Advantageous Effects

The present invention can inhibit an interference of the light source or a bracket supporting the light source by reducing the number of light sources. In addition, since it is possible to measure the angle of view of a camera by reducing the light sources, the present invention can reduce the manufacturing costs of a device for testing an angle of view of a camera. Furthermore, control is easy because a time for adjusting a distance between a light source and an image sensor can be greatly reduced, whereby it is possible to test a view angle of a particular camera and various other cameras as well, and therefore, the present invention is adequate to a super wide angle test measuring a horizontal view angle exceeding 180°.

BEST MODE

Figure 1:
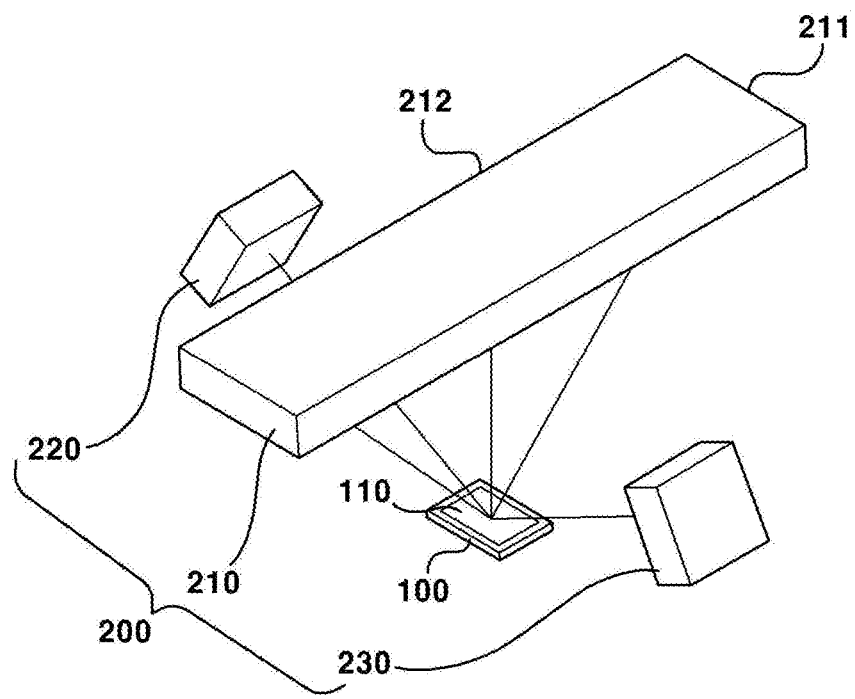
FIG. 1 is a schematic conceptual view of a camera view angle testing device in a form of a perspective view manner according to a first exemplary embodiment of the present invention.

Some of the exemplary embodiments of the present invention will be described with the accompanying drawings. Detailed descriptions of well-known functions, configurations or constructions are omitted for brevity and clarity so as not to obscure the description of the present disclosure with unnecessary detail. Furthermore, throughout the descriptions, the same reference numerals will be assigned to the same elements in the explanations of the figures.

Furthermore, the terms "first," "second," "A", "B", (a), (b) and the like, herein do not denote any order, quantity, or importance, but rather are used to distinguish one element from another. In the following description and/or claims, the terms coupled and/or connected, along with their derivatives, may be used. In particular embodiments, connected may be used to indicate that two or more elements are in direct physical and/or electrical contact with each other. "Coupled" may mean that two or more elements are in direct physical and/or electrical contact. However, coupled may also mean that two or more elements may not be in direct contact with each other, but yet may still cooperate and/or interact with each other. For example, "coupled", "joined" and "connected" may mean that two or more elements do not contact each other but are indirectly joined together via another element or intermediate elements.

<First Exemplary Embodiment>

Now, a configuration of a camera view angle testing device according to a first exemplary embodiment of the present invention will be described in detail with reference to the accompanying drawings.

Figure 2:
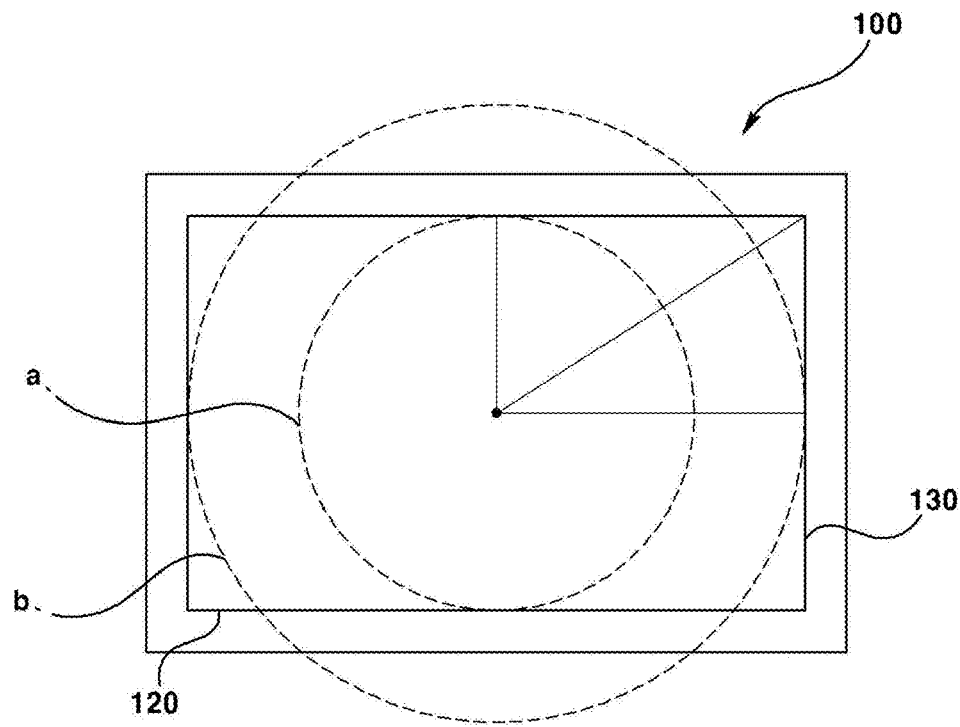
FIG. 2 is a schematic plan view illustrating an image sensor disposed at a camera view angle testing device according to a first exemplary embodiment of the present invention.
Figure 3:
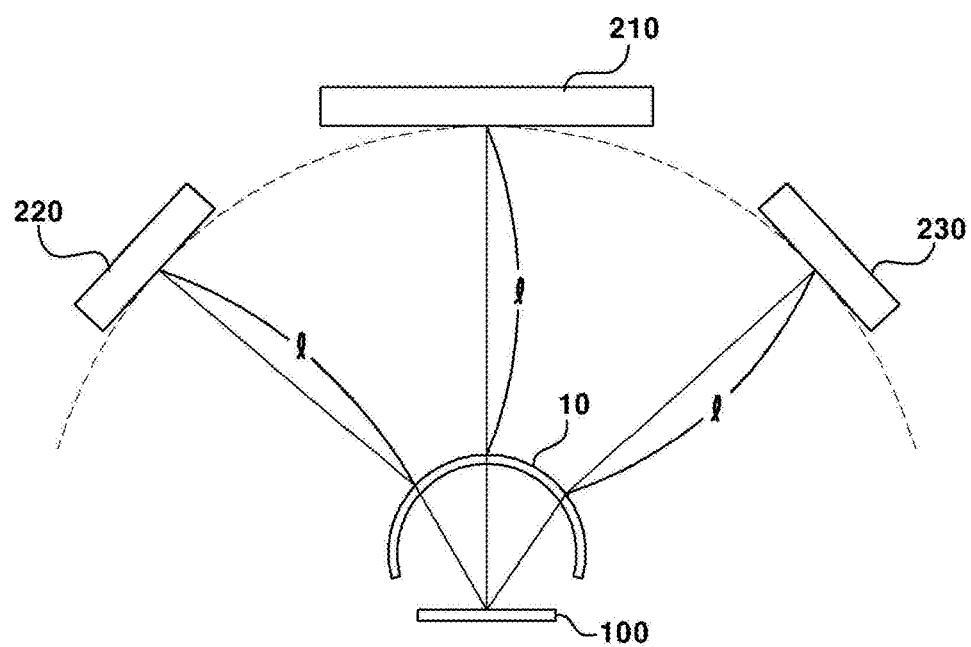
FIG. 3 is a schematic view illustrating a camera view angle testing device in a form of a cross-sectional view manner according to a first exemplary embodiment of the present invention.
Figure 4:
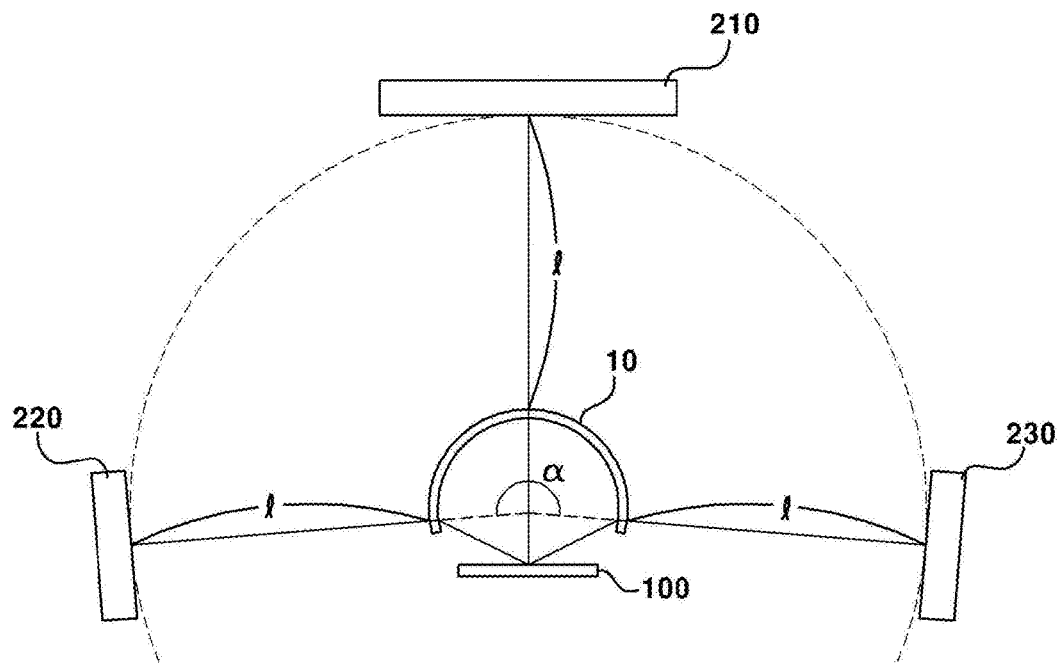
FIG. 4 is a schematic view illustrating a modification of FIG. 3.

FIG. 1 is a schematic conceptual view of a camera view angle testing device in a form of a perspective view manner according to a first exemplary embodiment of the present invention, FIG. 2 is a schematic plan view illustrating an image sensor disposed at a camera view angle testing device according to a first exemplary embodiment of the present invention, FIG. 3 is a schematic view illustrating a camera view angle testing device in a form of a cross-sectional view manner according to a first exemplary embodiment of the present invention, and FIG. 4 is a schematic view illustrating a modification of FIG. 3.

Referring to FIG. 1, the camera view angle testing device according to the first exemplary embodiment of the present invention may include first to third light sources (210, 220, 230). Each of the first to third light sources (210, 220, 230) may include an LED (Light-Emitting Diode) lamp. For example, each of the first to third light sources (210, 220, 230) may be partially formed with an LED lamp, or may be formed to include a plurality of LED lamps. Furthermore, the first light source (210) may take a larger area than an area in which the second and third light sources are combined, and the first light source (210) may be formed to have an area to cover the second and third light sources (220, 230). In addition, albeit not being illustrated in the drawings, a structure formed with a predetermined pattern may be provided between the first to third light sources (210, 220, 230) and a lens (10), and a light received on an image sensor (100) can have the predetermined pattern by the structure to allow the image sensor (100) to test detection of the light. Furthermore, although FIG. 1 has not illustrated the lens (10) in the configuration of the camera module, FIG. 1 is intended to illustrate arrangement of the image sensor (100) and the first to third light sources (210, 220, 230), and therefore, it should be imagined that the lens (10) exists between the image sensor (100) and the first to third light sources (210, 220, 230) (see FIGS. 3 and 4). In addition, it should be also appreciated that the size of the image sensor (100) is illustrated in an exaggerated manner in order to help understand the first exemplary embodiment of the present invention. albeit not being illustrated in the drawings, a frame (not shown) or a bracket (not shown) supporting the first to third light sources (210, 220, 230) may be provided to adjust positions of the first to third light sources (210, 220, 230).

Now, referring to FIGS. 3 and 4, the first light source (210) may be disposed to face the image sensor (100, described later) to irradiate a light toward the image sensor (100). In other words, the first light source (210) may be disposed to face and in parallel with the image sensor (100). Although the first light source (210) is illustrated in a shape of a rectangle or an oval shape, the present invention is not limited thereto, and the first light source (210) may take various shapes. Referring to FIG. 1, the first light source (210) may include a first width (211) and a second width (212). The first width (211) and the second width (212) may be mutually orthogonally formed and the first width (211) may be narrower than the second width (212). That is, the first light source (210) may be configured in such a manner that the second width (212) is formed to be longer than the first width (211) to allow measuring a vertical view angle of the lens (10) on the image sensor (100).

The second light source (220) and the third light source (230) may be so disposed as to symmetrically face at both sides of the first light source (210). That is, the second light source (220) and the third light source (230) may be symmetrically disposed relative to an optical axis of a lens module or a camera module to be tested, and may be symmetrically disposed about a straight line perpendicular to an upper surface of the image sensor (100). Thus, the second light source (220) and the third light source (230) may be so disposed as not to be in parallel with an optical axis, and the second light source (220) and the third light source (230) may be slantedly disposed relative to an optical axis. The second light source (220) and the third light source (230) may be formed in a relatively smaller size than the first light source (210).

Although FIG. 1 has illustrated that each of the second light source (220) and the third light source (230) takes a square shape, the present invention is not limited thereto, and the second light source (220) and the third light source (230) may be disposed to a lengthwise direction of the first width (211) at the first light source (210) to allow measuring a horizontal view angle of the lens (10). To be more specific, the horizontal view angle of the lens (10) may be changed that is measurable in response to an arrangement of the second light source (220) and the third light source (230). For example, the lens (10) may have a view angle exceeding 180° corresponding to a supper wide angle in the first exemplary embodiment of the present invention, whereby the second light source (220) and the third light source (230) may be so arranged as to be over 180° (α) about the image sensor (100) in response to a user selection (see FIG. 4) in order to measure the view angle of the lens (10). Furthermore, the second light source (220) and the third light source (230) may be so arranged as to abut to the first light source (210), which may depend on intention of a user that intends to measure a view angle of the lens (10).

FIG. 2 is a schematic plan view illustrating an image sensor disposed at a camera view angle testing device according to a first exemplary embodiment of the present invention.

Referring to FIG. 2, the image sensor (100) according to a first exemplary embodiment of the present invention may take a square shape, and may have a third width (120) and a fourth width (130). At this time, each of the third width (120) and the fourth width (130) may have a same length or may have a different length. For example, the third width (120) may be formed to be longer than the fourth width (130). Furthermore, the third width (120) may be formed in parallel with a direction of the first width (211) of the first light source (210), and the fourth width (130) may be formed in parallel with a direction of the second width (212) to correspond to the second width (212) of the first light source (210).

The image sensor (100) may be provided at one surface with a light reception area (110) to receive a light from a light source, where it is explained hereinafter that a point from a center of the light reception area (110) to a farthest area of the light reception area (110) is classified as 0~1 field, where the field may include an area (i.e., concentric circle) as much as a distance from the center of the light reception area (110).

Referring to FIGS. 1 and 2, the first light source (210) is configured to measure a vertical view angle of a lens (not shown) and may have a second width (212) in order to receive a light to be irradiated on an area from 0 field to 0.5 field (a) on the image sensor (100). Although it is not that the other remaining areas in the light reception area (110) on the image sensor (100) do not receive a light, there is no need to measure all the vertical view angles according to the first exemplary embodiment of the present invention, because the horizontal view angle is more important than the vertical view angle of the lens in terms of characteristics of a vehicle camera. However, when the image sensor (100) is squarely formed, a light irradiated on an area up to 0.5 field can cover an area to a fourth width (130) direction from the center of the light reception area (110).

Meantime, the second light source (220) and the third light source (230) are intended to measure a horizontal view angle of the lens, and may be disposed at an area where the first light source (210) having the first width (211) cannot irradiate a light to the lens (10). In other words, the second light source (220) and the third light source (230) may be symmetrically arranged about an optical axis in response to a user's selection, or may be arranged along a lengthwise direction of the first width (211) of the first light source (210), where a wider horizontal view angle can be measured when an arrangement angle of the second light source (220) and the third light source (230) is widened. At this time, a horizontal view angle of a light irradiated from the second light source (220) and the third light source (230) can be measured from 0 field to 0.7 field (b).

As detailed above, the light may be measured at a wider area (0 to 0.7 field) than an area (0 to 0.5 field) measuring the vertical view angle, because the horizontal view angle is more important than the vertical view angle of the lens in the aspect of characteristics of a vehicle camera according to the first exemplary embodiment of the present invention. In other words, a light from the first to third light sources (210, 220, 230) can be received at an area of lengthwise direction based on the light reception area (110), where the light can cover a fourth width (130) corresponding to the vertical view angle. It should be apparent that other remaining areas than 0 to 0.7 field in the light reception area (110) can receive a light.

Now, referring to FIGS. 3 and 4, the first to third light sources (210, 220, 230) in the camera view angle testing device according to the first exemplary embodiment of the present invention may be disposed at a tangent surface on one spherical surface. That is, a distance from each of the first to third light sources (210, 220, 230) to the lens (10) is same (l), and when a nearest distance from each of the first to third light sources (210, 220, 230) to the lens (10) is extended, the distances may meet at a center of a sphere where the first to third light sources (210, 220, 230) are tangent surfaces to thereby form a radius of the sphere. Furthermore, the first to third light sources (210, 220, 230) may be so arranged as to form a perpendicular line on a surface facing the lens (10) of the first to third light sources (210, 220, 230) relative to a straight line formed as a shortest distance from the center of the image sensor (110) to the first to third light sources (210, 220, 230).

Furthermore, the second light source (220) and the third light source (230) may be so arranged as to meet a view angle desired to be measured by the user's selection. For example, as illustrated in FIG. 4, the second light source (220) and the third light source (230) may be so arranged as to be widened at more than 180° from the center of the imaginary sphere. That is, unexplained reference numeral α in FIG. 4 indicates an angle over 180°.

<Second Exemplary Embodiment>

Now, a configuration of a camera view angle testing device according to a second exemplary embodiment of the present invention will be described in detail with reference to the accompanying drawing.

Figure 5:
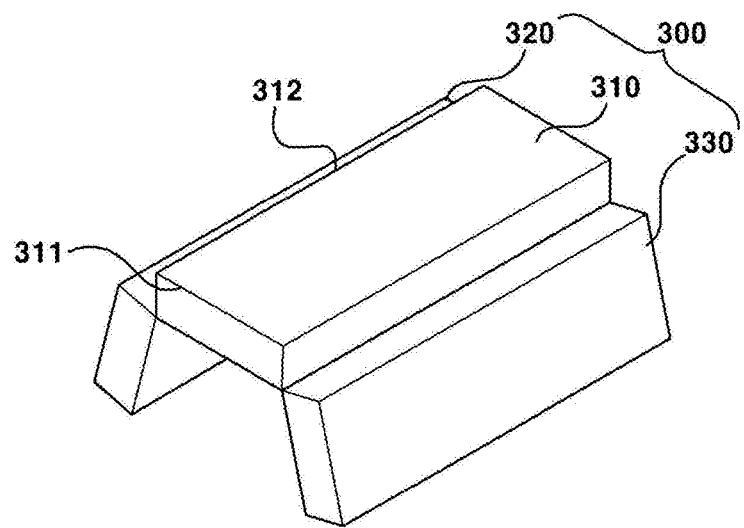
FIG. 5 is a schematic conceptual view of camera view angle testing device in a form of a perspective view manner according to a second exemplary embodiment of the present invention.

FIG. 5 is a schematic conceptual view of camera view angle testing device in a form of a perspective view manner according to a second exemplary embodiment of the present invention.

Referring to FIG. 5, the camera view angle testing device according to the second exemplary embodiment of the present invention may include first to third light sources (310, 320, 330), where the second light source (320) and the third light source (330) may be arranged to a lengthwise direction of a first width (311), and where a distance to a lengthwise direction of a second width (312) of the second and third light sources (320, 330) may be identical to a distance of the second width (312) of the first light source (310), which is to measure not only a horizontal view angle of a lens (not shown) but also a vertical view angle of the lens, and other details are same as those in the first exemplary embodiment except for the length to a direction of second width (312) at the second and third light sources (320, 330).

Furthermore, although FIG. 5 has illustrated that the second and third light sources (320, 330) are arranged to abut to both sides of a first width (311) direction of the first light source (310), the present invention is not limited thereto, and depending on a user's selection, it is possible for the second and third light sources (320, 330) to be arranged to be spaced apart from the first light source (310) in order to measure a horizontal view angle of a lens as in the first exemplary embodiment of the present invention. In addition, when the lens is so formed as to have a view angle corresponding to a super wide angle exceeding 180° in order to measure a view angle of the lens, the second and third light sources (320, 330) may be arranged to be widened over 180° about an image sensor (not shown). Hereinafter, other content to the second exemplary embodiment will be omitted because it can be inferred from the first exemplary embodiment.

<Third Exemplary Embodiment>

Now, a configuration of a camera view angle testing device according to a third exemplary embodiment of the present invention will be described in detail with reference to the accompanying drawings.

Figure 6:
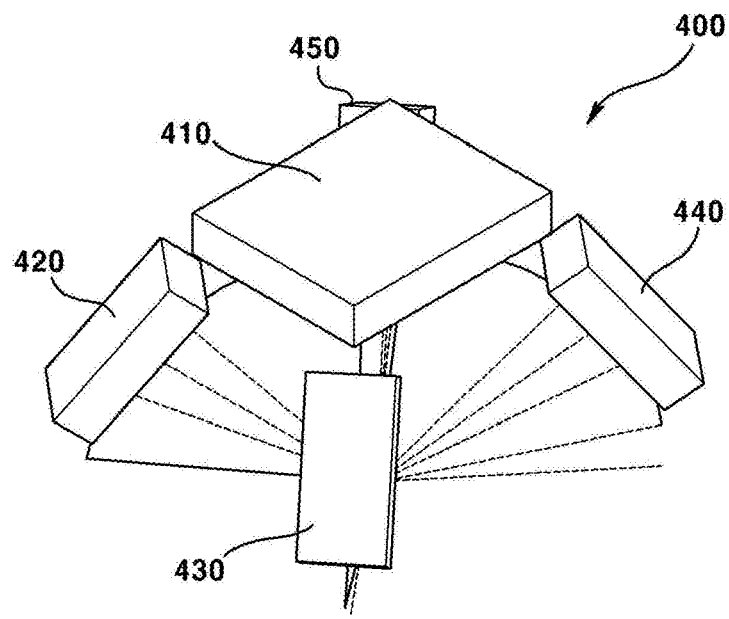
FIG. 6 is a schematic conceptual view of camera view angle testing device in a form of a perspective view manner according to a third exemplary embodiment of the present invention.
Figure 7:
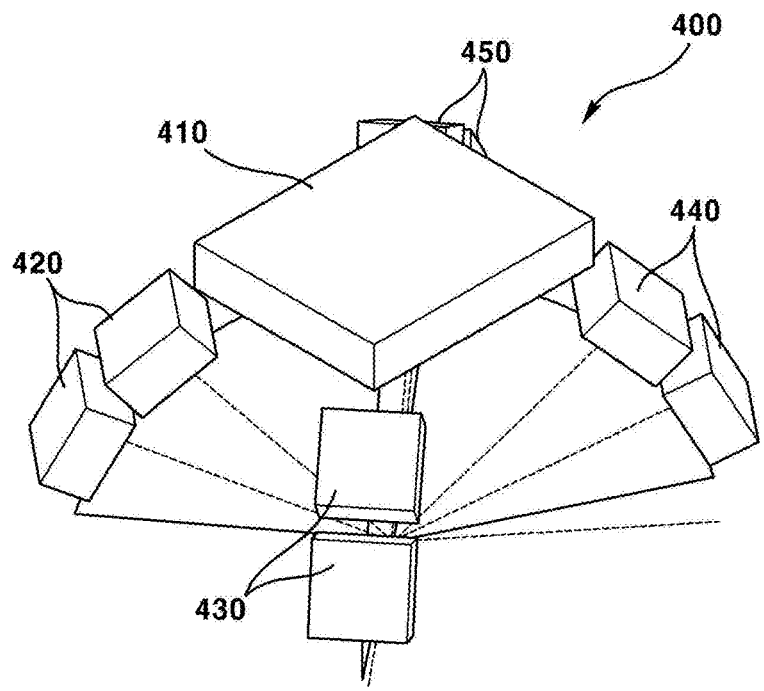
FIG. 7 is a schematic view illustrating a modification of FIG. 6.

FIG. 6 is a schematic conceptual view of camera view angle testing device in a form of a perspective view manner according to a third exemplary embodiment of the present invention, and FIG. 7 is a schematic view illustrating a modification of FIG. 6.

Referring to FIG. 6, a light source (400) may include first to fifth light sources (410, 420, 430, 440, 450), where the second to fifth light sources (420, 430, 440, 450) may be arranged in a radially unfolded manner about the first light source (410). That is, the first light source (410) may be formed in a shape of a square, and a center of the second to fifth light sources (420, 430, 440, 450) may be disposed on a plane including a straight line formed to a diagonal direction from a center of the first light source (410).

For example, any one diagonal line of the first light source (410) and the second light source (420) and fourth light sources (440) may abut to any one imaginary semi-circle about an image sensor (100). Furthermore, another diagonal line of the first light source (410) and the third light source (430) and the fifth light source (450) may abut to another imaginary semi-circle about the image sensor (100). Still furthermore, albeit not being illustrated in the drawing, other light sources may be further arranged depending on a user's intention in addition to the second to fifth light sources (420, 430, 440, 450) in the third exemplary embodiment of the present invention.

Referring to FIG. 7, a plurality of second to fifth light sources (420, 430, 440, 450) may be formed. That is, the plurality of second to fifth light sources (420, 430, 440, 450) may be arranged on an imaginary semi-circle about the image sensor (100). At this time, a plurality of second light sources (420) and a plurality of fourth light sources (440) may be arranged on one semi-circle about the image sensor (100), and a plurality of third light sources (430) and a plurality of fifth light sources (450) may be arranged on another semi-circle about the image sensor (100). However, the number of light sources is not limited as long as it is an arrangement for measuring a view angle according to a user's intention.

The abovementioned camera view angle testing device according to the first to third exemplary embodiments of the present invention is not only for measuring a view angle of a camera, but also for performing a function of matching a focus of a light received by the image sensor (100). That is, when a twist or a tilt of an image sensor (100) is generated in the course of assembling a camera module, it is possible to accurately adjust a focus of a received light by adjusting a position of the image sensor (100) in response to the light irradiated by the first light source (210, 310) arranged vertically to an optical axis of the image sensor (100).

Although the abovementioned embodiments have been described in detail in order to implement the camera view angle testing device according to the present invention, the embodiments are, however, intended to be illustrative only, and thereby do not limit the scope of protection of the present invention. Thereby, it should be appreciated by the skilled in the art that changes, modifications and amendments to the above examples may be made without deviating from the scope of protection of the invention.

The invention claimed is:

1. A device for testing an angle of view of a camera, the camera comprising an image sensor, the device comprising:
   a first light source for measuring a vertical view angle of the camera, the first light source being disposed over the image sensor, wherein the first light source is arranged to face the image sensor, wherein the first light source comprises a first side having a first width and extending in a first lengthwise direction, and a second side having a second width extending in a second lengthwise direction different from the first lengthwise direction, and wherein the second width is longer than the first width; and
   a second light source and a third light source for measuring a horizontal view angle of the camera, the second light source and the third light source being respectively disposed on both opposite sides, in the first lengthwise direction, of the image sensor.

2. The device of claim 1, wherein the image sensor receives a light emitted from the first light source to a direction perpendicular to the second side at 0~0.7 field, and the image sensor receives a light emitted from the first light source to a direction perpendicular to the first side at 0~0.5 field, when the image sensor is divided from a center of a light reception region to a farthest point at 0~0.7 field.

3. The device of claim 2, wherein the image sensor comprises: a first side having a third width and extending in the first lengthwise direction; and a second side having a fourth width and extending in the second lengthwise direction, wherein the fourth width is shorter than the third width.

4. The device of claim 1, wherein the first lengthwise direction is orthogonal to the second lengthwise direction.

5. The device of claim 1, wherein the first light source is disposed in parallel with the image sensor.

6. The device of claim 1, wherein the second light source or the third light source is disposed at an angle of over 180° along the first lengthwise direction.

7. The device of claim 1, wherein the second light source or the third light source is disposed at a radius-identical imaginary spherical tangent surface.

8. The device of claim 1, wherein at least one of the second light source and the third light source is configured such that a width thereof, measured in the second lengthwise direction, is shorter than the second width.

9. The device of claim 1, wherein at least one of the second light source and the third light source is configured such that a width thereof, measured in the second lengthwise direction, is the same as the second width.

10. The device of claim 1, wherein any one or more of the first to third light sources includes an LED lamp.

11. A device for testing an angle of view of a camera, the camera comprising an image sensor, the device comprising:

a first light source for measuring a vertical view angle of the camera, the first light source being disposed over the image sensor, being arranged to face an the image sensor and comprising a first corner, a second corner, a third corner, and a fourth corner; and a second light source, a third light source, a fourth light source, and a fifth light source for measuring a horizontal view angle of the camera;

wherein the second light source is arranged corresponding to and facing the first corner of the first light source while being directly under a first imaginary line that goes through a center of the first light source and the first corner of the first light source;

wherein the third light source is arranged corresponding to and facing the second corner of the first light source while being directly under a second imaginary line that goes through the center of the first light source and the second corner of the first light source;

wherein the fourth light source is arranged corresponding to and facing the third corner of the first light source while being directly under a third imaginary line that goes through the center of the first light source and the third corner of the first light source; and wherein the fifth light source is arranged corresponding to and facing the fourth corner of the first light source while being directly under a fourth imaginary line that goes through the center of the first light source and the fourth corner of the first light source.

12. The device of claim 11, wherein at least two of the second light source, the third light source, the fourth light source, and the fifth light source are disposed directly above a fifth imaginary line that traces a circumference of an imaginary circle lying in a same plane as the image sensor and having a center of the image sensor as its center.

* * * * *